United States Patent [19]

Iizuka

[11] Patent Number: 5,148,190
[45] Date of Patent: Sep. 15, 1992

[54] SCANNING OPTICAL SYSTEM WITH PLURAL FOCUSING UNITS

[75] Inventor: Takashi Iizuka, Tokyo, Japan

[73] Assignee: Asahi Kogaku Kogya K.K., Tokyo, Japan

[21] Appl. No.: 629,951

[22] Filed: Dec. 19, 1990

[30] Foreign Application Priority Data

Dec. 19, 1989 [JP] Japan .............................. 1-146817[U]

[51] Int. Cl.$^5$ ............................................. H04N 1/21
[52] U.S. Cl. .................................... 346/108; 359/205
[58] Field of Search ................. 346/108, 76 L, 107 R, 346/160; 355/202; 359/205, 206

[56] References Cited

U.S. PATENT DOCUMENTS 4,123,135 10/1978 Rabedeau ............................ 359/205
5,009,472 4/1991 Morimoto ............................ 359/206

FOREIGN PATENT DOCUMENTS 59-34512 2/1984 Japan .
192714 4/1989 Japan .

Primary Examiner—Mark J. Reinhart
Attorney, Agent, or Firm—Sughrue, Mion, Zinn Macpeak & Seas

[57] ABSTRACT

A scanning optical system is disclosed which comprises a light source unit emitting generally parallel rays of light, a deflector which deflects the rays of light issuing from the light source unit, a first focusing optical unit that is provided between the light source unit and the deflector, that has power in a direction perpendicular to the direction in which the rays of light are to be deflected, with the principal point being located outside the first optical unit toward the light source unit, and that focuses the incident rays of light to form a line image at a point close to the deflector, and a second focusing optical unit that permits the deflected rays of light to be focused on the object to be scanned.

11 Claims, 3 Drawing Sheets

SCANNING OPTICAL SYSTEM WITH PLURAL FOCUSING UNITS

BACKGROUND OF THE INVENTION

This invention relates to an improved scanning optical system suitable for use with image recording apparatuses such as laser printers.

Scanning optical systems of the type contemplated by the present invention are highly sensitive to "tilting errors", or errors due to the inclination of reflecting faces of the deflector such as a polygonal mirror. A method commonly employed to compensate for such tilting errors is to focus rays of light and form an image in a sub-scanning cross section at a point near the deflector. The term "sub-scanning cross section" as used herein means a cross section that includes the optical axis and which is perpendicular to a main scanning cross section where rays of light are scanned with the deflector.

FIG. 7 is a simplified cross-sectional view of a conventional scanning optical system as taken in a sub-scanning direction. Divergent rays of light issuing from a semiconductor laser 1 serving as a light source are collimated into a parallel beam by means of a collimator lens 2. The parallel beam emerging from the collimator lens 2 passes through a planoconvex cylindrical lens 3 having power only in a sub-scanning cross section and forms a line image at a point near a reflecting face 4 of a polygonal mirror. The reflected beam passes through an fθ lens 5 to form a spot that is scanned over an object of interest in a main scanning direction.

The cylindrical lens 3 used in this prior art system is shown more specifically in FIG. 8 and the numerical values that characterize this lens are listed in Table 1 below. According to the data shown in Table 1, the second principal point H is located within the lens. The symbols used in Table 1 have the following definitions: f, the focal length at the wavelength 780 nm; TL, the distance from the first surface of the lens to the focal point F; fB, the distance from the last surface of the lens to the focal point F; r, the radius of curvature of a surface in the sub-scanning cross section; d, the lens thickness; $n_d$, the refractive index of the lens at the d-line ($\lambda = 588$ nm); $v_d$, the Abbe number; and $n_{780}$, the refractive index of the lens at the wavelength 780 nm.

TABLE 1

| Surface No. | r | d | $n_d$ | $v_d$ | $n_{780}$ |
|---|---|---|---|---|---|
| \multicolumn{6}{l}{f = 50.00 mm; TL = 51.35; fB = 47.35} |
| 1 | 25.536 | 4.00 | 1.51633 | 64.1 | 1.51072 |
| 2 | ∞ | | | | |

The scanning optical system of the type described above which is customarily used with laser printers is such that the principal point of the fθ lens is in the sub-scanning cross section is located fairly close to the polygonal mirror, with the imaging magnification set at a large value. This presents the problem that if the optical characteristics of the lens system vary on account of various factors including temperature changes, the position where a beam spot is to be formed is also likely to change. Since the change in the spot forming position in the main scanning cross section can be neglected for practical purposes, astigmatism will occur to produce a deformed spot that is elongated in the sub-scanning direction. As a consequence, the resolution and hence the printing performance deteriorates, which certainly is a serious problem in laser printers that require particularly high precision.

In order to reduce the variation in the spot forming position that can be caused by temperature changes or other phenomena, it may be proposed that the imaging magnification be lowered by locating the principal point of fθ lens 5 at a point closer to the object to be scanned. In this arrangement, the distance from the point of light convergence to the principal point of the fθ lens is increased, so if the angle of convergence of rays emerging from the fθ lens is the same as in the case shown in FIG. 7, the angle of spread of rays that can be admitted into the fθ lens will decrease. Assuming the arrangement shown in FIG. 8 which is identical to the case shown in FIG. 7 as far as the light source 1, collimator lens 2 and the cylindrical lens 3 are concerned, the angle of spread of rays that can be admitted into the fθ lens is so small that the effective diameter of flux issuing from the collimator lens will decrease to attenuate the energy that can be taken from the light source.

To increase the ratio of energy to flux diameter, the energy of the light source may be increased. However, semiconductor lasers which are commonly used today with image recording apparatuses such as laser printers are only capable of insuring stable outputs up to powers of approximately 3 mW and their operation will become unstable if the power output is further enhanced.

In order to keep the magnifying power of the fθ lens as low as possible and yet to insure that the effective diameter of flux issuing from the collimator lens is the same as in the case shown in FIG. 7, it is necessary to use a cylindrical lens having an increased focal length as shown in FIG. 10 but then the distance between the point of light convergence and the cylindrical lens will unduly increase to produce a bulky overall system.

SUMMARY OF THE INVENTION

The present invention has been made in view of the above circumstances and it has as principal object providing a scanning optical system that successfully reduces the magnifying power of an fθ lens without increasing the overall size and without causing undue losses to the energy that can be taken from a light source as compared to the case where high magnifications are realized.

To achieve this object, the scanning optical system of the present invention comprises a light source unit emitting generally parallel rays of light, a deflector that deflects the rays of light issuing from the light source unit, a first focusing optical unit that is provided between the light source unit and the deflector, that has power in a direction perpendicular to the direction in which the rays of light are to be deflected, with the principal point being located outside said unit toward the light source unit, and that focuses the incident rays of light to form a line image at a point close to the deflector, and a second focusing optical unit that permits the deflected rays of light to be focused on the object to be scanned.

According to this arrangement, the distance between the point of light convergence by the first focusing optical unit and the second focusing optical unit can be shortened even if flux of a large diameter is issued from the light source unit.

DETAILED DESCRIPTION OF THE INVENTION

The present invention is described below in detail with reference to FIGS. 1-5 which illustrate an example of the scanning optical system of the invention.

The overall arrangement of this system is first described with reference to FIGS. 1 and 2.

Figure 1:
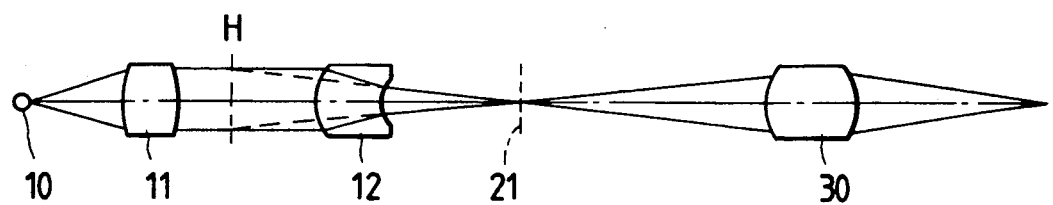
FIG. 1 is a simplified cross section of one example of the scanning optical system of the present invention as taken in a sub-scanning direction.
Figure 2:
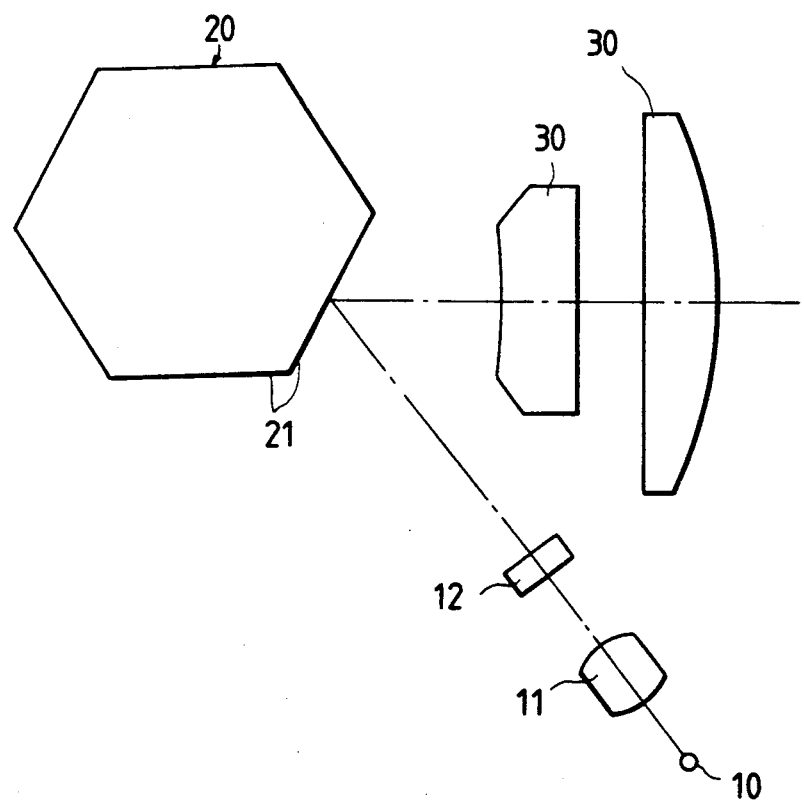
FIG. 2 is a plan view of the scanning optical system shown in FIG. 1.

FIG. 1 is a schematic cross section of the system as taken in a sub-scanning direction and FIG. 2 is a plan view of FIG. 1. As shown, the optical system comprises a semiconductor laser 10 serving as a light source, a collimator lens 11 that collimates the rays of divergent light from the semiconductor laser 10 serving as a light source, a collimator lens 11 that collimates the rays of divergent light from the semiconductor laser 10 into a parallel beam, a cylindrical lens 12 that serves as a first focusing optical unit which focuses said parallel beam to form a line image, a polygonal mirror 20 as a deflector that reflects and deflects the focused beam by a reflecting face 21 located near the position where the line image is formed, and an fθ lens 30 that serves as a second focusing optical unit which converges the reflected beam from the polygonal mirror 20 to form a spot on the surface of an object being scanned.

The fθ lens 30 is made of two lens elements as shown in FIG. 2 but they are collectively shown as a single lens in FIG. for the sake of simplicity.

Rays of divergent light issuing from the semiconductor laser 10 are collimated with the collimator lens 11 and the resulting parallel beam passes through the cylindrical lens 12 to be focused on a reflecting face of the polygonal mirror 20, from which it is reflected and deflected to form a spot that is scanned at constant speed over the object of interest.

Figure 3:
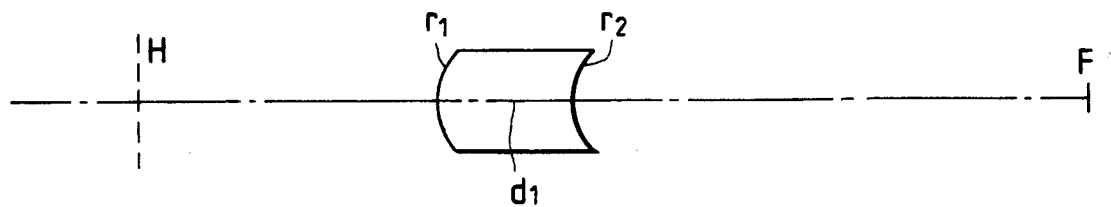
FIG. 3 is a partial enlarged view showing the cylindrical lens portion of FIG. 2.

In the example under consideration the first focusing optical unit is the positive cylindrical lens 12 which, as shown in FIG. 3, has such a meniscus shape that it has a convex surface directed toward the light source. In the case where a single cylindrical lens is used, it is preferable to meet the condition:

$$r1 < f \cdot (n-1)/n \quad (1)$$

where r1 is the radius of curvature of the surface directed toward the light source, n is the refractive index, and f is the focal length. Unless this condition is met, it is impossible to shift the principal point toward the light source. The numerical values that characterize this cylindrical lens 12 are shown in Table 2 below and the symbols used in this table have the same definitions as those used in Table.

TABLE 2

| Surface No. | r | d | $n_d$ | $v_d$ | $n_{780}$ |
|---|---|---|---|---|---|
| 1 | 7.535 | 10.00 | 1.51633 | 64.1 | 1.51072 |
| 2 | 5.172 | | | | | f = 75.00 mm; TL = 51.35; fB = 41.35

According to this data, the second principal point H of the cylindrical lens 12 is located ahead of its first surface (on the left side of FIG. 3). Accordingly, the rays of light passing through the cylindrical lens 12 converge as if they were refracted starting at the principal point H, with the ray trace being indicated by the dashed lines in FIG. 1. As a result, the distance from the lens 12 to the point of light convergence can be shortened even if flux of large diameter issues from the collimator lens 11. Stated conversely, if the distance TL from the first surface of the cylindrical lens 12 to the focal point F and the F number of the fθ lens are made equal to the values for the conventional case shown in FIG. 6, the parallel beam issuing from the collimator lens 11 can be effectively admitted into the fθ lens even if the flux diameter is increased to 1.5 times the value for the prior art case.

Two modified versions of the cylindrical lens 12 used as the first focusing optical unit are described below. In either case, the focal length and the distance TL from the first surface to the focal point F are the same as in the example described just above..

Figure 4:
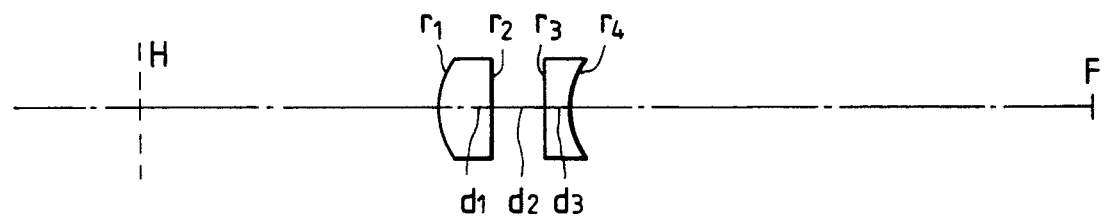
FIG. 4 is a simplified cross section showing a first modification of the cylindrical lens shown in FIG. 3.

FIG. 4 shows the first modification in which the cylindrical lens 12 consists of the combination of a planoconvex positive lens and a planoconcave negative lens. The numerical values that characterize the composition of this cylindrical lens are listed in Table 3 below, in which d signifies the lens thickness of the aerial distance between lens surfaces.

TABLE 3

| Surface No. | r | d | $n_d$ | $v_d$ | $n_{780}$ |
|---|---|---|---|---|---|
| 1 | 9.075 | 4.00 | 1.51633 | 64.1 | 1.51072 |
| 2 | ∞ | 4.00 | | | |
| 3 | ∞ | 2.00 | 1.51633 | 64.1 | 1.51072 |
| 4 | 6.557 | | | | | f = 75.00 mm; TL = 51.35; fB = 41.35

Figure 5:
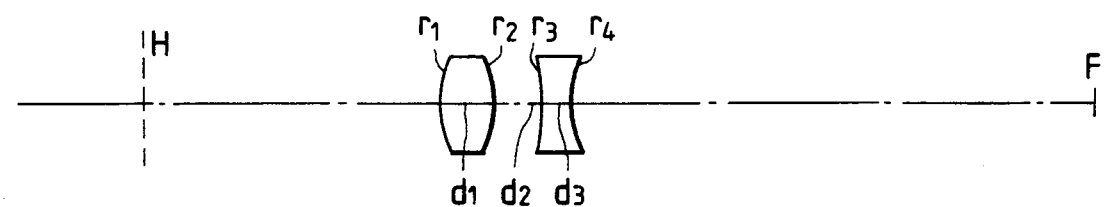
FIGS. 5 and 6 are simplified cross sections showing second and third modifications of the cylindrical lens shown in FIG. 3.

FIG. 5 shows the second modification in which the cylindrical lens 12 consists of the combination of a biconvex positive lens and a biconcave negative lens. The numerical values that characterize the composition of this cylindrical lens are listed in Table 4 below, in which d signifies the lens thickness or the aerial distance between lens surfaces.

TABLE 4

| Surface No. | r | d | $n_d$ | $v_d$ | $n_{780}$ |
|---|---|---|---|---|---|
| 1 | 12.964 | 4.00 | 1.51633 | 64.1 | 1.51072 |
| 2 | −15.000 | 4.00 | | | | f = 75.00 mm; TL = 51.35; fB = 41.35

TABLE 4-continued

| f = 75.00 mm; TL = 51.35; fB = 41.35 | | | | | |
|---|---|---|---|---|---|
| Surface No. | r | d | $n_d$ | $v_d$ | $n_{780}$ |
| 3 | −15.000 | 2.00 | 1.51633 | 64.1 | 1.51072 |
| 4 | 7.914 | | | | |

Figure 6:
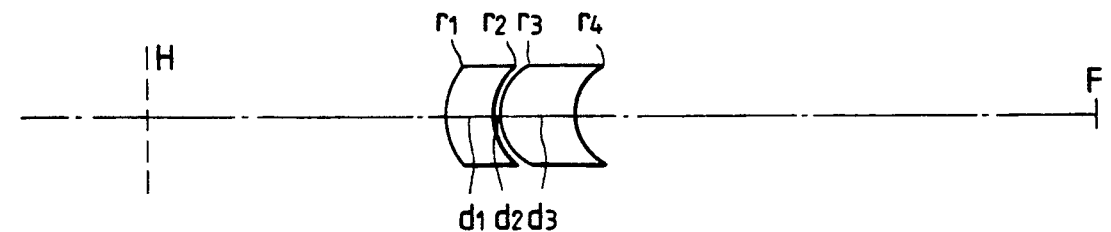
Figure 7:
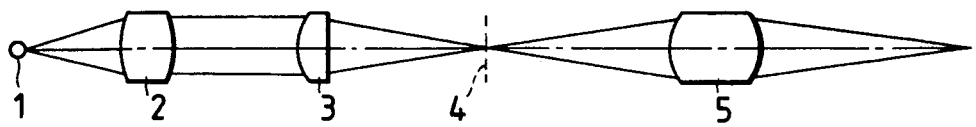
FIG. 7 is a simplified cross section of a prior art scanning optical system, as taken in a sub-scanning direction, that uses an fθ lens having a comparatively high magnifying power.
Figure 8:
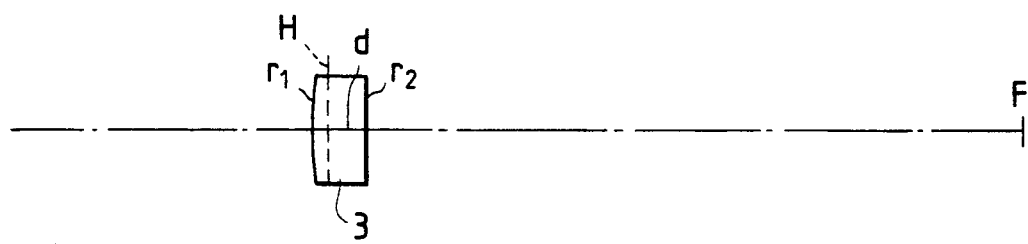
FIG. 8 is a partial enlarged view showing the cylindrical lens portion of FIG. 7.
Figure 9:
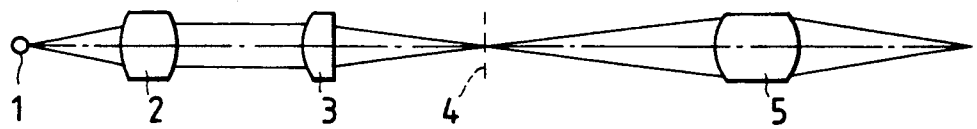
FIGS. 9 and 10 are simplified cross sections of other prior art scanning optical systems, as taken in a sub-scanning direction, that use an fθ lens having a comparatively low magnifying power.
Figure 10:
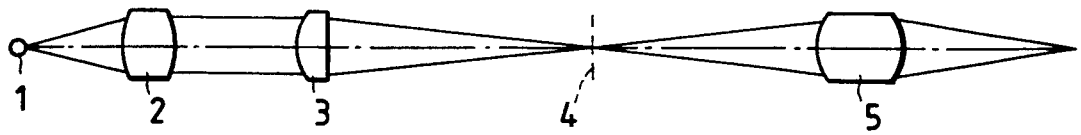

FIG. 6 shows a third modification in which a negative lens is disposed on the light source side in a combination of a positive and negative lens arrangement. The specific structure is shown in Table 5.

TABLE 5

| f = 75.00 mm; TL = 51.35; fB = 41.35 | | | | | |
|---|---|---|---|---|---|
| Surface No. | r | d | $n_d$ | $v_d$ | $n_{780}$ |
| 1 | 7.500 | 3.50 | 1.51633 | 64.1 | 1.51072 |
| 2 | 4.800 | 0.50 | | | |
| 3 | 4.507 | 6.00 | 1.51633 | 64.1 | 1.51072 |
| 4 | 4.545 | | | | |

In any modification the advantage is the same as that of the first example shown in FIG. 3. According to the modifications, it is possible to effectively introduce a light flux from the light source into the fθ lens with a simple structure even if the magnification of the fθ lens is decreased.

Whichever modification is adopted, the result is the same as in the example shown in FIG. 3 and even if the magnifying power of the fθ lens is low, the flux from the light source can be effectively admitted into the fθ lens despite the compactness of the lens arrangement.

The cylindrical lens need not always be adapted to form a line image on a reflecting face of the polygonal mirror. In certain cases, a line image may preferably be formed at a point ahead of a reflecting face of the polygonal mirror in order to eliminate adverse effects due to surface flaws or dust particles on that reflecting face.

As described on the foregoing pages, the scanning optical system of the present invention is characterized in that the first focusing optical unit has its principal point located outside of it toward the light source. Because of this feature, the distance between the light source and the deflector can be sufficiently shortened to improve the coupling efficiency even if the angle of spread of rays that can be admitted into the fθ lens is small.

What is claimed is:

1. A scanning optical system which comprises:
   a light source unit emitting generally parallel rays of light;
   a deflector that deflects the rays of light issuing from the light source unit;
   a first focusing optical unit that is provided between the light source unit and the deflector, said first optical unit having power in a direction perpendicular to the direction in which the rays of light are to be deflected, the principal point thereof being interposed between said optical unit and said light source unit, and focusing the incident rays of light from said light source unit to form a line image at a point close to the deflector; and
   a second focusing optical unit focusing the deflected rays of light on an object to be scanned, said second focusing unit being interposed between said deflector and the object to be scanned.

2. A scanning optical system according to claim 1 wherein said first focusing optical unit is a meniscus lens having a convex surface directed toward the light source unit.

3. A scanning optical system according to claim 2 wherein said first optical unit meets the following condition:

where $r_1 < f \cdot (n-1)/n$ where $r_1$ is the radius of curvature of a surface of said first optical unit directed toward said light source unit, n is the refractive index thereof and f is the focal length thereof.

4. A scanning optical system according to claim 1 wherein said first focusing optical unit consists of the combination of a positive and a negative lens element.

5. A scanning optical system which comprises:
   a light source unit emitting generally parallel rays of light;
   a deflector that deflects the rays of light issuing from the light source unit;
   a first focusing optical unit provided between the light source unit and the deflector, said first optical unit having power in a direction perpendicular to the direction in which the rays of light are to be deflected, the principal point thereof being interposed between said optical unit and said light source unit, and focusing the incident rays of light from said light source unit to form a line image at a point close to the deflector;
   a collimating lens unit interposed between said light source and said first focusing optical unit; and
   a second focusing optical unit focusing the deflected rays of light on an object to be scanned, said second focusing unit being interposed between said deflector and the object to be scanned.

6. A scanning optical system as claimed in claim 1 wherein said first focusing optical unit consists of the combination of a planoconvex positive lens and a planoconvex negative lens, said planoconvex positive lens being positioned closest to said light source.

7. A scanning optical system as claimed in claim 1 wherein said first focusing optical unit consists of the combination of a biconvex positive lens and biconcave negative lens, said biconvex positive lens being positioned closest to said light source.

8. A scanning optical system as claimed in claim 1 wherein said first focusing optical unit consists of the combination of a positive and negative lens each having convex surfaces directed toward said light source, said negative lens being positioned closest to said light source.

9. A scanning optical system as claimed in claim 5 wherein said first focusing optical unit consists of the combination of a planoconvex positive lens and a planoconvex negative lens, said planoconvex positive lens being positioned closest to said light source.

10. A scanning optical system as claimed in claim 5 wherein said first focusing optical unit consists of the combination of a biconvex positive lens and biconcave negative lens, said biconvex positive lens being positioned closest to said light source.

11. A scanning optical system as claimed in claim 5 wherein said first focusing optical unit consists of the combination of a positive and negative lens, each having convex surfaces directed toward said light source, said negative lens being positioned closest to said light source.

* * * * *

UNITED STATES PATENT AND TRADEMARK OFFICE
CERTIFICATE OF CORRECTION

PATENT NO. : 5,148,190
DATED : September 15, 1992
INVENTOR(S) : Takashi Iizuka

It is certified that error(s) appears in the above-identified patent and that said Letters Patent is hereby corrected as shown below:

Cover page [73] Assignee: Delete "Asahi Kogaku Kogya K.K." to --Asahi Kogaku Kogyo K.K.--

Signed and Sealed this

Seventeenth Day of October, 1995

*Attest:*

BRUCE LEHMAN

*Attesting Officer*         *Commissioner of Patents and Trademarks*